(12) United States Patent
Sfar

(10) Patent No.: US 9,491,718 B2
(45) Date of Patent: Nov. 8, 2016

(54) METHOD OF COMMUNICATION IN A CELLULAR NETWORK BETWEEN A BASE STATION AND A USER EQUIPMENT

(71) Applicant: ST-Ericsson SA, Plan-les-Ouates (CH)

(72) Inventor: Safouane Sfar, Nuremberg (DE)

(73) Assignee: ST-ERICSSON SA, Plan-les-Ouates (CH)

( * ) Notice: Subject to any disclaimer, the term of this patent is extended or adjusted under 35 U.S.C. 154(b) by 62 days.

(21) Appl. No.: 14/360,956

(22) PCT Filed: Nov. 16, 2012

(86) PCT No.: PCT/EP2012/072881
§ 371 (c)(1),
(2) Date: May 28, 2014

(87) PCT Pub. No.: WO2013/079341
PCT Pub. Date: Jun. 6, 2013

(65) Prior Publication Data
US 2014/0349702 A1 Nov. 27, 2014

Related U.S. Application Data

(60) Provisional application No. 61/579,066, filed on Dec. 22, 2011.

(30) Foreign Application Priority Data

Nov. 30, 2011 (EP) ..................................... 11306592

(51) Int. Cl.
H04B 7/00 (2006.01)
H04W 52/34 (2009.01)
(Continued)

(52) U.S. Cl.
CPC ......... *H04W 52/343* (2013.01); *H04W 52/146* (2013.01); *H04W 52/346* (2013.01); *H04W 52/367* (2013.01); *Y02B 60/50* (2013.01)

(58) Field of Classification Search
None
See application file for complete search history.

(56) References Cited

U.S. PATENT DOCUMENTS 6,941,152 B2* 9/2005 Proctor, Jr. ............. H04L 41/12
343/703
2011/0287804 A1 11/2011 Seo et al.
(Continued)

FOREIGN PATENT DOCUMENTS

WO 2011/035807 A1 3/2011

OTHER PUBLICATIONS

International Search Report issued in corresponding International application No. PCT/EP2012/072881, date of mailing Jan. 11, 2013.
Written Opinion of the International Searching Authority issued in corresponding International application No. PCT/EP2012/072881, date of mailing Jan. 11, 2013.
(Continued)

*Primary Examiner* — Mohammed Rachedine
(74) *Attorney, Agent, or Firm* — Patent Portfolio Builders PLLC

(57) ABSTRACT

A method of communication between a base station and a user equipment in a cellular network includes providing, from the base station to the user equipment, a new allowed maximum transmitting power lower than a former allowed maximum transmitting power because of a traffic load increase within the base station cell. If the user equipment later sends a message to the base station, with a transmitting power exceeding the new allowed maximum transmitting power, the base station may decide not to reject user equipment's message depending on at least one condition.

19 Claims, 3 Drawing Sheets

(51) Int. Cl.
*H04W 52/14* (2009.01)
*H04W 52/36* (2009.01)

(56) References Cited

U.S. PATENT DOCUMENTS

2012/0083301 A1\* 4/2012 Hwang ................ H04W 28/04
 455/501
2012/0176998 A1\* 7/2012 Muellner ............ H04W 52/343
 370/329

OTHER PUBLICATIONS

Müllner, Robert et al., "Enhancing uplink performance in UTRAN LTE networks by load adaptive power control," European Transactions on Telecommunication, Wiley & Sons, Chichester, GB, vol. 21, No. 5, Aug. 1, 2010, pp. 458-468, XP001557117, ISSN: 1124-318X, DOI: 10.1002/ETT.1426.

Extended European Search Report issued in corresponding European patent application No. 11 30 6592, date of completion, Feb. 24, 2012.

\* cited by examiner

METHOD OF COMMUNICATION IN A CELLULAR NETWORK BETWEEN A BASE STATION AND A USER EQUIPMENT

TECHNICAL FIELD

The invention relates to methods of communication in a cellular network between a base station and a user equipment involving management of a maximum allowable transmitting power specified by network which is used to limit the UE's uplink transmission power on a carrier frequency.

BACKGROUND

The 3GPP Release 8 introduced the Long Term Evolution (LTE) that provides core network entities for supporting real-time voice and multimedia IP services. Given that there is a worldwide growth in the number of mobile subscribers, with the majority of the multimedia traffic evolving from low data rate speech and modest rate text messaging towards high data rate, an increasing contribution of information technology to the overall energy consumption of the world is observed. Therefore, there is a need to reduce the energy requirements of radio access networks. Hence, energy consumption will become a more important constraint in the design of future mobile communications systems.

According to a prior art, for example described in international application WO201135807, it is known for the base station to adapt maximal allowed transmitting power to be used by user equipments to send a message to base station according to traffic load within base station cell. The higher the traffic load, the lower the maximal allowed transmitting power to avoid interference as well as excess noise within base station cell. At a given time, the same maximal allowed transmitting power is broadcast for all user equipments within a base station cell. Its value depends on traffic load within the base station cell.

SUMMARY

The object of embodiments of the present invention is to alleviate at least partly the above mentioned drawbacks.

More particularly, embodiments of the invention aim to achieve a good trade-off between on one hand a low given transmitting power maximum within a cell, in order to reduce interference and noise because of high traffic load in network cell, and on the other hand having as few as possible user equipments which can no more transmit, because the low given maximum transmitting power is smaller than their needed minimum terminal transmit power.

Therefore, according to some embodiments of the invention, a user equipment sending a message to a base station, when sending it with a transmitting power exceeding allowed maximum transmitting power in the cell, will no more be systematically rejected by the base station. On the contrary, at least when one or more conditions are fulfilled, instead of rejecting the message sent by a user equipment with a transmitting power exceeding allowed maximum transmitting power, the base station will preferably negotiate with this user equipment a specific allowed maximum transmitting power dedicated to this user equipment and different from the general allowed maximum transmitting power issued by base station, normally applicable to all user equipments of base station cell.

According to some embodiments of the invention, a base station can improve the power control management procedure in a wireless network with a set of user equipments, in order to facilitate the required power reduction at the cell level.

According to some embodiments of the invention, the base station has the possibility to restrict the terminal's transmitting power maximum by dedicated signaling or by system information broadcast using the Radio Resource Control (RRC) parameter P-Max as specified in 3GPP technical specification 36.331. This parameter P-Max is preferably used for the negotiation between base station and user equipment about a dedicated allowed maximum transmitting power.

One object is achieved with a method of communication in a cellular network between a base station and a user equipment, comprising providing, from the base station to the user equipment, a new allowed maximum transmitting power, wherein the new allowed maximum transmitting power is lower than a former allowed maximum transmitting power if a specific traffic load increase has occurred within the base station cell; and if the user equipment sends a message to the base station with a transmitting power exceeding said new allowed maximum transmitting power, deciding, by the base station, depending on at least one condition whether or not to reject the user equipment message.

Preferred embodiments comprise one or more of the following features:

the base station granting the user equipment having exceeded said new allowed maximum transmitting power, a particular allowed maximum transmitting power dedicated to said user equipment, wherein the particular allowed maximum transmitting power is higher than the new allowed maximum transmitting power.

the particular allowed maximum transmitting power is lower than the transmitting power having exceeded said new allowed maximum transmitting power.

the base station initiating handover to another cell of the user equipment having exceeded said new allowed maximum transmitting power in connected mode; and the user equipment initiating cell reselection in idle mode.

the user equipment exceeding said new allowed maximum transmitting power if said new allowed maximum transmitting power is below a needed transmitting power minimum for said user equipment to send a message to base station.

the user equipment signaling an indication of an excess power of said sent message using a specific information field associated with the sent message.

at least one of said at least one condition is related to the traffic load within the base station cell.

the at least one of said at least one condition comprises one or more of the traffic load itself; the number or proportion of user equipments having exceeded said new allowed maximum transmitting power; the amount or proportion of the user equipment's transmitted power in excess of said new allowed maximum transmitting power; and the density of traffic load around user equipment(s) having exceeded said new allowed maximum transmitting power.

at least one of said at least one condition comprises the type of subscribed category of the user equipment.

if the user equipment is in idle mode when the new allowed maximum transmitting power is provided from the base station, the user equipment sends the message with the transmitting power exceeding said new allowed maximum transmitting power after a move from idle mode to connected mode has occurred.

base station requests user equipment having exceeded said new maximum in idle mode to release connection with redirection.

the step of providing, from the base station to the user equipment, a new allowed maximum transmitting power, comprises the new allowed maximum transmitting power being lower than a former allowed maximum transmitting power if the traffic load within the base station cell exceeds a traffic load threshold.

a computer program product comprising a computer readable medium, having thereon a computer program comprising program instructions, the computer program being loadable into a data-processing unit and adapted to cause execution of the method when the computer program is run by the data-processing unit.

Another object if achieved with a base station of cellular network comprising a transmitter adapted to provide a user equipment with a new allowed maximum transmitting power lower than former allowed maximum transmitting power if a specific traffic load increase has occurred within the base station cell, a receiver adapted to receive a message from said user equipment, a controller adapted, if the transmitting power of said received message exceeds said new maximum, to decide, depending on at least one condition, whether or not to reject said received message.

Still another object is achieved with a user equipment of cellular network comprising a receiver adapted to receive from a base station a new allowed maximum transmitting power lower than a former allowed maximum transmitting power if a specific traffic load increase has occurred within the base station cell, a comparator adapted to compare said new maximum with its own needed transmitting power minimum to send a message to base station, a transmitter adapted, if said own minimum exceeds said new maximum, to still send, to said base station, a message with said own minimum needed transmitting power, a processor adapted to signal an indication of an excess power of said sent message with specific information field associated with the sent message.

According to some embodiments of the invention, negotiation is performed through the Radio Resource Control Connection Reconfiguration procedure.

According to some embodiments of the invention, specific information field is the changing of the value of a spare bit in a Radio Resource Control Connection Request message or RRC Connection Reconfiguration Complete message.

According to some embodiments of the invention, base station is an eNodeB of a Long Term Evolution network.

Further features and advantages of the invention will appear from the following description of embodiments of the invention, given as non-limiting examples, with reference to the accompanying drawings listed hereunder.

DETAILED DESCRIPTION

Figure 1:
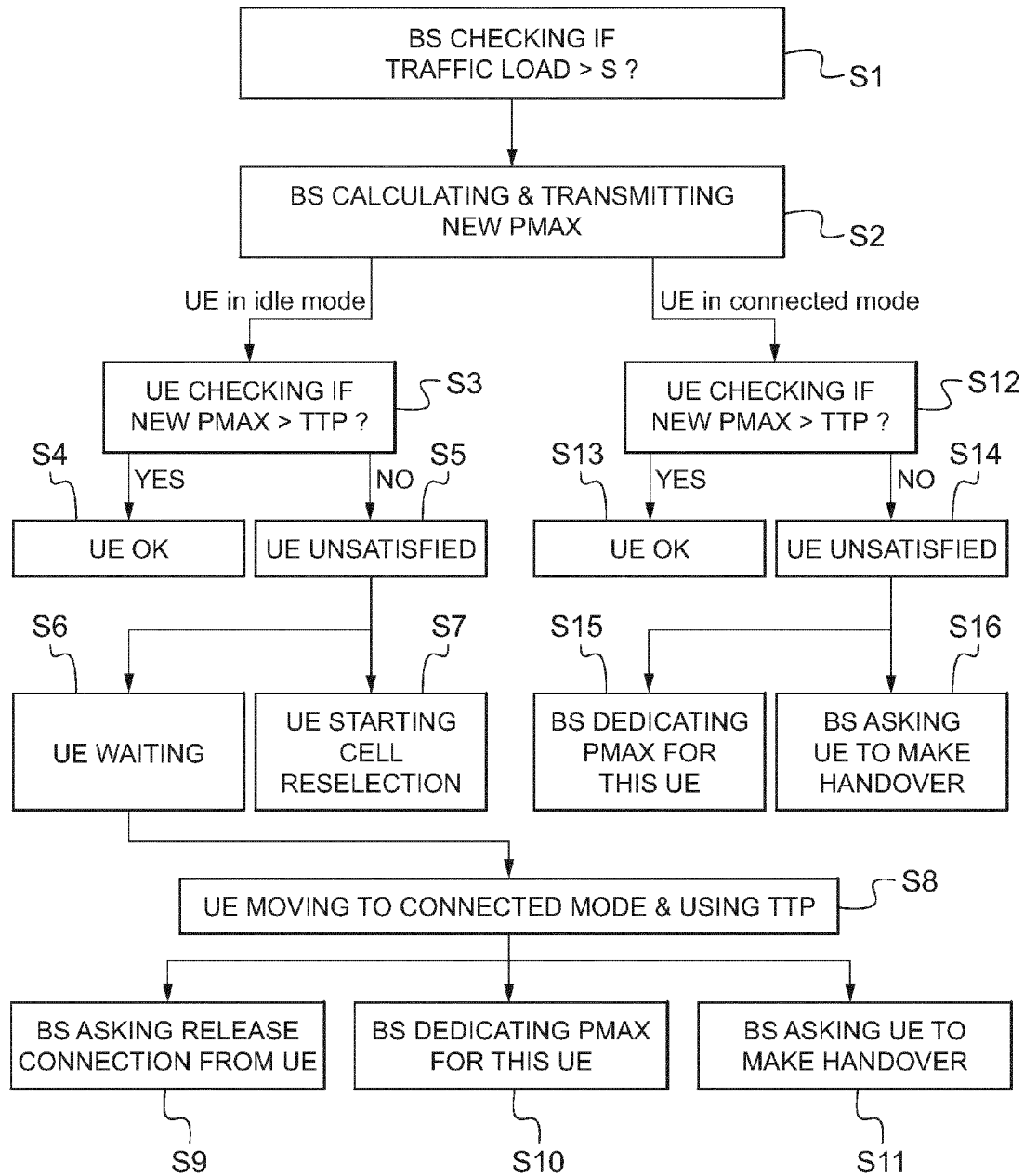
FIG. 1 shows an example of the steps of a communication method according to an embodiment of the invention.

FIG. 1 shows an example of the steps of a communication method according to an embodiment of the invention. The method comprises the following steps, which are a checking step S1, a transmitting step S2, a checking step S3, an accepting step S4, a dissatisfaction step S5, a waiting step S6, a reselecting step S7, a moving step S8, a release step S9, a dedicating step S10, a handover step S11, a checking step S12, an accepting step S13, a dissatisfaction step S14, a dedicating step S15, a handover step S16. When starting the method, in a cell of a base station of a cellular network, for all user equipments of this cell, there is an allowed maximum transmitting power. The method steps according to some embodiments of the invention can be applied to the high layers of user equipments and of network elements on the side of base station including base station itself.

In the checking step S1, at the base station side, it is checked if the traffic load in its cell is higher or not than a predetermined traffic load threshold. This predetermined traffic load threshold can be a fixed threshold This predetermined traffic load can also be a dynamic threshold whose variation is given by network. This threshold is already calculated at the network level. This comparison of the traffic load to a predetermined traffic load threshold can be performed at network level and the result of comparison can be given to the base station. If the traffic load within the base station cell is not above the predetermined traffic load threshold, then, after a while, checking step S1 is performed again. If traffic load within base station cell is above predetermined traffic load threshold, then we go to transmitting step S2.

In the transmitting step S2, at the base station side, a new allowed maximum transmitting power is calculated. So, when the traffic load increases in a cell, allowed maximum transmitting power value within this cell decreases and hence the transmitting power maximum allowed to the user equipment will decrease accordingly to avoid more interference and noise. The way to decrease can be for example a one step decrease, or a continuous decrease, a decrease in several successive steps.

Whenever, while performing the method steps, traffic load changes so that a new allowed maximum transmitting power is calculated at base station side, then this has the priority and method starts again at transmitting step S1.

This new allowed maximum transmitting power depends on one or more parameters, one of these parameters being the traffic load itself. This new allowed maximum transmitting power can be calculated at the network level. This new allowed maximum transmitting power can then be given to base station. The base station will forward this new allowed maximum transmitting power to user equipments of base station cell. User equipments in idle mode may find this new allowed maximum transmitting power on System Information Block (SIB), whereas user equipments in connected mode may receive this new allowed maximum transmitting power through RRC messages.

Then, when traffic load is big in a cell, all user equipments within this cell are invited to reduce their power to the new level sent by network through base station. However, some user equipments within this cell may fail to transmit with this new allowed maximum transmitting power, because their respective minimum terminal transmit powers are above this new allowed maximum transmitting power. This may be the case for example for a user equipment which is at the cell border. The steps S3 to S16 are here to help failing user equipments to still be able to communicate with base station.

We go to checking step S3 if the user equipment is in idle mode, where steps S4 to S11 can be performed. If the user equipment is in connected mode we go to the checking step S12, where steps S13 to S16 can be performed.

In the checking step S3, the user equipment compares this new allowed maximum transmitting power with its minimum terminal transmit power (MTTP). Minimum Terminal transmit power is the minimal power that the user equipment needs to be able to communicate with network, that is to say with the base station corresponding to the cell where the user equipment is indeed. This minimum terminal transmit power is regularly updated depending on radio conditions changing at the user equipment level. If new allowed maximum transmitting power is above the minimum terminal transmit power, then user equipment goes to accepting step S4. If new allowed maximum transmitting power is below the minimum terminal transmit power, then user equipment goes to dissatisfaction step S5.

In the accepting step S4, since new allowed maximum transmitting power is above the minimum terminal transmit power, everything is OK. The user equipment can communicate with base station in base station cell, while respecting this new allowed maximum transmitting power in base station cell, when sending a message to base station to access to the network. User equipment will use new allowed maximum transmitting power in the next Random Access Channel (RACH) procedure.

In the dissatisfaction step S5, since new allowed maximum transmitting power is below the minimum terminal transmit power, this is not OK. The user equipment cannot communicate with base station in base station cell, without violating this new allowed maximum transmitting power in base station cell, when sending a message to base station. Then, we can go to waiting step S6 (e.g. if there is no other cell which is available) or to cell reselection step S7 if there is at least one other cell which is available.

In the waiting step S6, the user equipment may not react until a communication with base station is first needed, which is to say until the establishment of a RRC connection between user equipment and base station, then we go to step S8.

In the reselecting step S7, the user equipment may start a cell reselection, which may succeed if another cell (a neighbor cell) is available. This target cell should have allowed maximum transmitting power above the minimum terminal transmit power.

In the moving step S8, the user equipment moves from idle mode to connected mode. User equipment tries to maintain RRC connection. However, to do so, user equipment will violate new allowed maximum transmitting power, because, to be sure to be able to communicate with base station, user equipment will use minimum terminal transmit power instead of new allowed maximum transmitting power. In a preferred option, better described with respect to FIG. 2, besides using minimum terminal transmit power instead of new allowed maximum transmitting power in the message sent to base station, user equipment will also explicitly signal to base station its inability to abide by new allowed maximum transmitting power. User equipment will for example signal it by using special bit field in the RRC connection request message, a spare bit. This redundancy, on the user equipment side, in sending a message to base station, avoids any misinterpretation of base station with respect to the too high power level of received message. Each user equipment which detects that it can voluntarily reduce its power compared with the new allowed maximum transmitting power without any deterioration of Quality of Service (QoS) will be detected by the base station side of network during connection establishment.

In the release step S9, the base station side of network asks user equipment to release connection with redirection, with the same conditions as in a Circuit Switching Fall Back (CSFB) if the base station cannot accept the minimum terminal transmit power of the user equipment and if there is no handover possibilities.

In the dedicating step S10, the base station side of network tries to adjust an allowed maximum transmitting power which would be dedicated to the particular user equipment who has signaled, implicitly or explicitly, to base station its inability to abide by new allowed maximum transmitting power, because this new allowed maximum transmitting power is too low for user equipment since this new allowed maximum transmitting power is less than the minimum terminal transmit power of this user equipment.

First, base station may decide not to reject user equipment message depending on at least one condition. Base station may sometimes simply reject user equipment message when this condition is not fulfilled.

If this condition is fulfilled, then base station does not reject user equipment message, but base station may also not simply accept user equipment message. Preferably, base station will negotiate with user equipment having exceeded said new maximum, an allowed maximum transmitting power dedicated to said user equipment. The negotiated dedicated maximum might be higher than said new maximum and lower than transmitting power having exceeded said new maximum: it will then be a compromise between base station original requirement and user equipment original capability.

This condition, or one or several or all of these conditions, may be relative to traffic load within base station cell. Among one or more conditions relative to traffic load, there is the traffic load itself and/or the number or proportion of user equipments having exceeded said new maximum and/or the amount or proportion of transmitted power in excess of said new maximum and/or the density of traffic load around user equipment(s) having exceeded said new maximum.

As an example, below a second traffic load threshold higher than the first traffic load threshold of checking step S1, base station will start a negotiation with user equipment to reach a dedicated allowed maximum transmitting power, whereas above this second traffic load threshold, base station will not start a negotiation with user equipment to reach a dedicated allowed maximum transmitting power.

As another example, with a number of other "violating" user equipments below a predetermined threshold or a threshold itself depending on other parameters like depending on traffic load, base station will start this negotiation, whereas with a number of other user equipments above this predetermined threshold, base station will not start this negotiation.

As still another example, with a proportion of transmitted power in excess of said new maximum below a predetermined percentage or a percentage itself depending on other parameters like depending on traffic load, base station will start this negotiation, whereas with a proportion of transmitted power in excess of said new maximum above this predetermined percentage, base station will not start this negotiation.

As again another example, with the density of traffic load around user equipment having exceeded said new maximum below a predetermined threshold or a threshold itself depending on other parameters like depending on traffic load, base station will start this negotiation, whereas with the density of traffic load around user equipment having exceeded said new maximum below this predetermined threshold, base station will not start this negotiation.

Among one or more conditions not relative to traffic load, there is the type of subscribed category of user equipment. For example, for a "premium category" of user equipment, base station will start a negotiation with user equipment to reach a dedicated allowed maximum transmitting power, whereas for an "ordinary category" of user equipment, base station will not start a negotiation with user equipment to reach a dedicated allowed maximum transmitting power. One or more conditions relative to traffic load can be combined with one or more conditions not relative to traffic load. Combinations of conditions may include different priority level of some conditions over other conditions.

In the handover step S11, the base station side of network requires the user equipment to make a handover to another cell. This target cell should have allowed maximum transmitting power above the minimum terminal transmit power.

In the checking step S12, which is similar to checking step S3, the user equipment compares this new allowed maximum transmitting power with its minimum terminal transmit power MTTP. Minimum Terminal transmit power is the minimal power that the user equipment needs to be able to communicate with network, that is to say with the base station corresponding to the cell where the user equipment is indeed. This minimum terminal transmit power is regularly updated depending on radio conditions changing at the user equipment level. If new allowed maximum transmitting power is above the minimum terminal transmit power, then user equipment goes to accepting step S13. If new allowed maximum transmitting power is below the minimum terminal transmit power, then user equipment goes to dissatisfaction step S14.

In the accepting step S13, which is similar to the accepting step S4, since new allowed maximum transmitting power is above the minimum terminal transmit power, everything is OK. The user equipment can communicate with base station in base station cell, while respecting this new allowed maximum transmitting power in base station cell, when sending a message to base station to access to the network. User equipment will use new allowed maximum transmitting power from then on in any message it will send to base station.

In the dissatisfaction step S14, which is similar to the dissatisfaction step S5, since new allowed maximum transmitting power is below the minimum terminal transmit power, this is not OK. The user equipment cannot communicate with base station in base station cell, without violating this new allowed maximum transmitting power in base station cell, when sending a message to base station. So, at the network level, on the base station side, there will be a reaction. Each user equipment which detects that it can voluntarily reduce its power compared with the new allowed maximum transmitting power without any deterioration of Quality of Service (QoS) will be detected by the base station side of network during connection. Then, base station side of network may permit some unsatisfied user equipments to increase their power with some amounts, thanks to RRC Connection Reconfiguration procedure, and may be able to make a trade-off between all user equipments in a given cell. Then we can go to dedicating step S15 or to handover step S16.

The dedicating step S15 is similar to the dedicating step S10.

The handover step S16 is similar to the handover step S11. Here, base station side of network will help unsatisfied user equipments to make handover procedure and to move to another cell in case of their demand to have more power cannot be satisfied in the current cell. This target cell should have allowed maximum transmitting power above the minimum terminal transmit power. At the worst case, network will then request user equipments to their release connection and to go to idle mode. This kind of behavior should be very rare.

Figure 2:
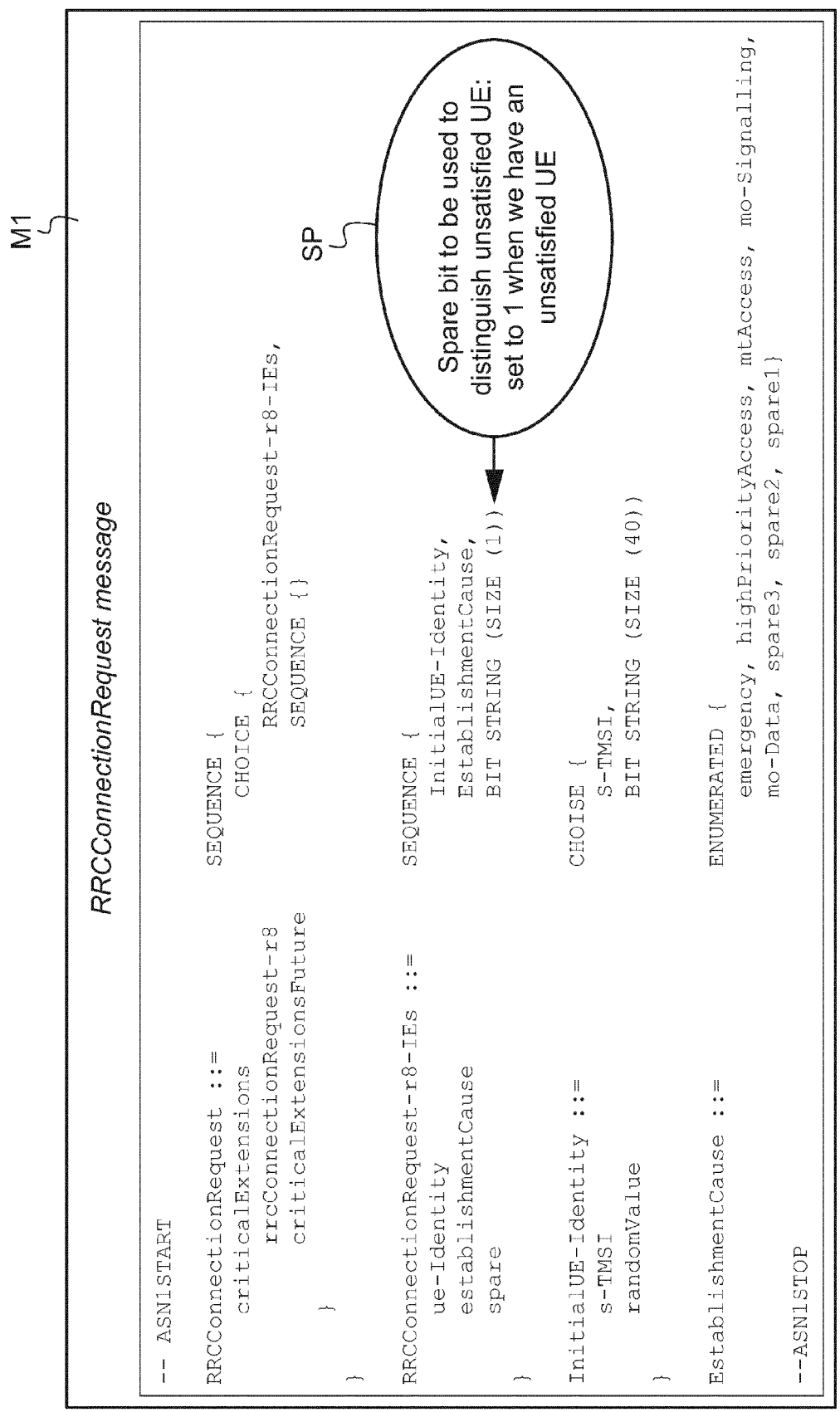
FIG. 2 shows an example of specific information field used by a step of a communication method according to an embodiment of the invention.

FIG. 2 shows an example of specific information field used by a step of a communication method according to an embodiment of the invention. Here, user equipment, besides exceeding said new maximum, also signals said excess in said sent message M1 with specific information field SP different from said excess itself. The message M1 is a RRC Connection Request message, and the specific information field SP is a spare bit in the second sequence of message M1. This spare bit SP can be set to 0 for all satisfied user equipments and set to 1 for all unsatisfied user equipments. In another option, for user equipment already in connected mode, a bit field can be added to RRC Connection Reconfiguration Complete message, sent by user equipment, in case of a too low new allowed maximum transmitting power which has been changed by the previous RRC Connection Reconfiguration Request message, sent by base station.

Figure 3:
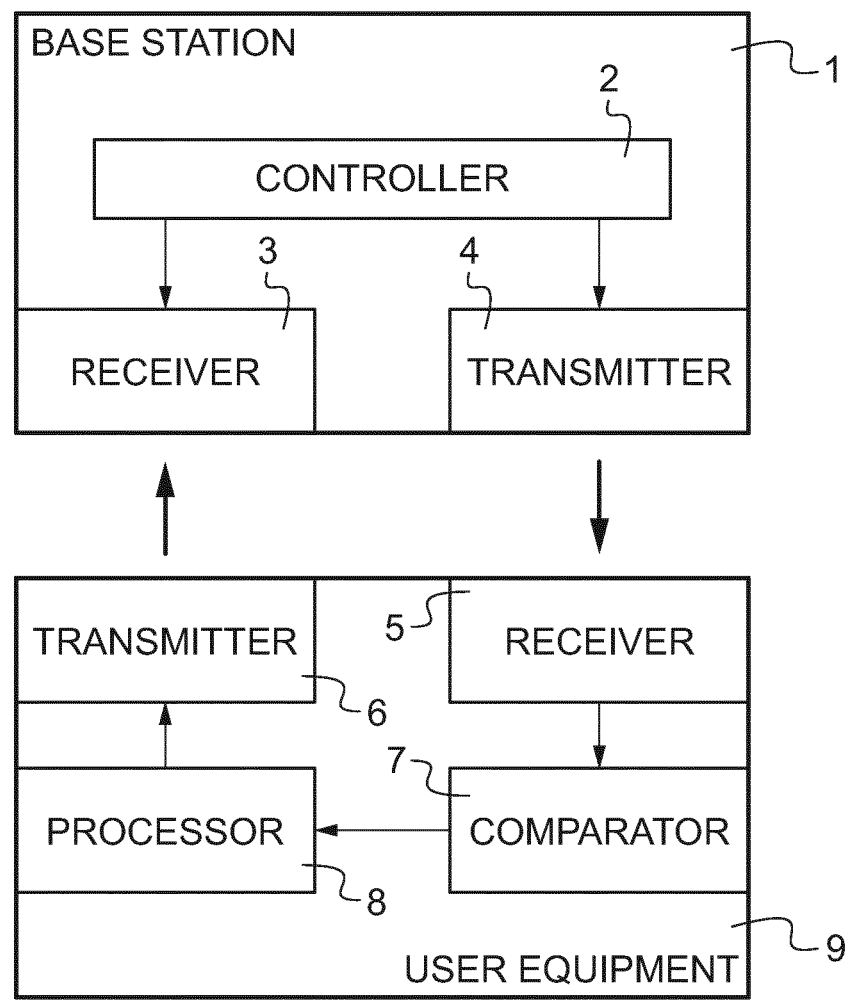
FIG. 3 shows an example of a base station and of a user equipment which can perform the steps of a communication method according to an embodiment of the invention.

FIG. 3 shows an example of a base station and of a user equipment which can perform the steps of a communication method according to an embodiment of the invention. This communication method is performed between a base station 1 and a user equipment 9. The base station 1 of cellular network comprises a transmitter 4, a receiver 3, and a controller 2. The user equipment 9 comprises a transmitter 6, a receiver 5, a comparator 7, and a processor 8. Some of the steps of the method can be performed at the base station side of the network, without being performed actually by the base station itself. Such steps may be performed by a network element different from the base station (and from the user equipment). The result of such steps may be sent to the base station so that the base station sends them to the user equipment.

The transmitter 4 of base station 1 is adapted to provide receiver 5 of user equipment 9 with a new allowed maximum transmitting power lower than former allowed maximum transmitting power because of traffic load increase within base station 1 cell. The receiver 3 of base station 1 is adapted to receive a message from transmitter 6 of user equipment 9. The controller 2 of base station 1 is adapted, if transmitting power of said received message exceeds said new maximum, to possibly decide not to reject said received message, depending on at least one condition, advantageously depending on traffic load. Preferably, the base station 1 is adapted to negotiate with user equipment 9 having exceeded said new maximum, an allowed maximum transmitting power dedicated to user equipment 9.

The receiver 5 of user equipment 9 is adapted to receive from transmitter 4 of base station 1 a new allowed maximum transmitting power which may be lower than former allowed maximum transmitting power because of traffic load increase within base station 1 cell. The comparator 7 is adapted to compare said new maximum with needed transmitting power minimum of user equipment 9 to send a message to base station 1. The transmitter 6 of user equipment 9 is adapted, if said minimum exceeds said new maximum, to still send later on, to transmitter 4 of base station 1, a message with this minimum needed transmitting power. The processor 8 of user equipment 9 is adapted to signal this excess in sent message with specific information field different from this excess itself.

As an option, to help making a trade-off between all user equipments of a cell, one or more ways to reduce actual transmitting power of user equipments whose minimum terminal transmit power is above or far above new allowed maximum transmitting power can be considered simultaneously to the communication method described according to some embodiments of the invention. Those user equipments will then be called "very satisfied" user equipments. For example, when very satisfied user equipment battery is weak, very satisfied user equipment will not use the new allowed maximum transmitting power given by base station side of network to save its battery power. So, in this case, and when very satisfied user equipment is not in mobility conditions and is with good radio conditions, very satisfied user equipment will decrease the new allowed maximum transmitting power given by base station side of network with an amount. Of course, very satisfied user equipment should remain capable of communicating with base station side of network with this new chosen actual transmitting power fixed on its side in such a way that is remains higher than its own minimum terminal transmit power.

Here is a list of used abbreviations:
SIB=System Information Block
RACH=Random Access Channel
RRC=Radio Resource Control
CSFB=Circuit Switching Fall Back
QoS=Quality of Service
MTTP=Minimum Terminal Transmit Power The invention has been described with reference to preferred embodiments. However, many variations are possible within the scope of the invention.

The invention claimed is:

1. A method of communication in a cellular network between a base station and a user equipment, the method comprising:
   providing, from the base station to the user equipment, a new allowed maximum transmitting power, wherein the new allowed maximum transmitting power is lower than a former allowed maximum transmitting power if a specific traffic load increase has occurred within a base station cell; and
   when the user equipment sends a message to the base station with a transmitting power exceeding said new allowed maximum transmitting power, deciding, by the base station, whether or not to reject the message based on a traffic load within the base station cell and a priority of the user equipment.

2. The method of communication according to claim 1, the method further comprising:
   the base station granting to the user equipment that has exceeded said new allowed maximum transmitting power, a particular allowed maximum transmitting power dedicated to said user equipment, wherein the particular allowed maximum transmitting power is higher than the new allowed maximum transmitting power.

3. The method of communication according to claim 2, wherein the particular allowed maximum transmitting power is lower than a transmitting power used by the user equipment to send the message, which transmitting power exceeded said new allowed maximum transmitting power.

4. The method of communication according to claim 1, the method further comprising:
   the base station initiating a handover of the user equipment that exceeded said new allowed maximum transmitting power in connected mode, to another cell; and
   the user equipment initiating a cell reselection in idle mode.

5. The method of communication according to claim 1, the method further comprising:
   the user equipment exceeding said new allowed maximum transmitting power if said new allowed maximum transmitting power is below a needed transmitting power minimum for said user equipment to send a message to base station.

6. The method of communication according to claim 5, the method further comprising:
   the user equipment signaling an indication of an excess power of said sent message using a specific information field associated with the sent message.

7. The method of communication according to claim 1, wherein to decide whether or not to reject the message with the transmitting power exceeding said new allowed maximum transmitting power, the base station considers one or more of:
   a traffic load level;
   a number or proportion of user equipment(s) having exceeded said new allowed maximum transmitting power;
   an amount or proportion of power in excess of said new allowed maximum transmitting power; and
   a density of traffic load around user equipment(s) having exceeded said new allowed maximum transmitting power.

8. The method of communication according to claim 1, wherein said priority of the user equipment is based on a type of subscribed category of the user equipment.

9. The method of communication according to claim 1, wherein, if the user equipment is in an idle mode when the new allowed maximum transmitting power is provided from the base station, the user equipment sends the message with a transmitting power exceeding said new allowed maximum transmitting power after a move from the idle mode to a connected mode has occurred.

10. The method of communication according to claim 1, wherein the base station requests the user equipment that has exceeded said new maximum power in an idle mode to release connection with redirection.

11. The method of communication according to claim 1, wherein the new allowed maximum transmitting power is lower than the former allowed maximum transmitting power if the traffic load within the base station cell exceeds a traffic load threshold.

12. A non-transitory computer readable medium storing a computer program comprising program instructions, the computer program being loadable into a data-processing unit of a base station, and causing, when the computer program is run by the data-processing unit, execution of a method comprising:
   providing, from the base station to a user equipment, a new allowed maximum transmitting power, wherein the new allowed maximum transmitting power is lower than a former allowed maximum transmitting power if a specific traffic load increase has occurred within a base station cell; and
   when the user equipment sends a message to the base station with a transmitting power exceeding said new allowed maximum transmitting power, deciding, by the base station, whether or not to reject the message based on a traffic load within the base station cell and a priority of the user equipment.

13. A base station of a cellular network, the base station comprising:

a transmitter configured to provide a user equipment with a new allowed maximum transmitting power lower than a former allowed maximum transmitting power if a specific traffic load increase has occurred within a base station cell;

a receiver adapted to receive a message from said user equipment; and a controller configured to decide, whether or not to reject said received message based on a traffic load within the base station cell and a priority of the user equipment, when a transmitting power of said received message exceeds said new allowed maximum transmitting power.

14. The base station according to claim 13, wherein the controller grants a particular allowed maximum transmitting power dedicated to said user equipment that has exceeded said new allowed maximum transmitting power, wherein the particular allowed maximum transmitting power is higher than the new allowed maximum transmitting power.

15. The base station according to claim 14, wherein the particular allowed maximum transmitting power is lower than a transmitting power used by the user equipment to send the message, which transmitting power exceeded said new allowed maximum transmitting power.

16. The base station according to claim 13, wherein the controller initiates a handover of the user equipment that exceeded said new allowed maximum transmitting power in connected mode, to another cell.

17. The base station according to claim 13, wherein the controller decides whether or not to reject the message with the transmitting power exceeding said new allowed maximum transmitting power by considering one or more of:
   a level of the traffic load;
   a number or proportion of user equipment(s) having exceeded said new allowed maximum transmitting power;
   an amount or proportion of power in excess of said new allowed maximum transmitting power; and
   a density of traffic load around user equipment(s) having exceeded said new allowed maximum transmitting power.

18. The base station according to claim 13, wherein the new allowed maximum transmitting power is lower than the former allowed maximum transmitting power if the traffic load within the base station cell exceeds a traffic load threshold.

19. The base station according to claim 13, wherein priority of the user equipment is based on a type of subscribed category of the user equipment.

* * * * *